(12) United States Patent  
Kang et al.

(10) Patent No.: US 9,054,576 B2  
(45) Date of Patent: Jun. 9, 2015

(54) HIGH EFFICIENCY DC/DC CONVERTER WITH HIGH CONVERSION RATIO

(71) Applicant: INDUSTRIAL COOPERATION FOUNDATION CHONBUK NATIONAL UNIVERISITY, Jeonju-si, Jeollabuk-do (KR)

(72) Inventors: Yong Cheol Kang, Jeonju-si (KR); Jul Ki Seok, Daegu (KR); Ali Gandomkar, Gyeongsan-si (KR)

(73) Assignee: INDUSTRIAL COOPERATION FOUNDATION CHONBUK NATIONAL UNIVERISITY, Jeonju-Si (KR)

( * ) Notice: Subject to any disclaimer, the term of this patent is extended or adjusted under 35 U.S.C. 154(b) by 219 days.

(21) Appl. No.: 13/649,698

(22) Filed: Oct. 11, 2012

(65) Prior Publication Data

US 2014/0055118 A1 Feb. 27, 2014

(30) Foreign Application Priority Data

Aug. 22, 2012 (KR) ........................ 10-2012-0091754

(51) Int. Cl.
*H02M 3/18* (2006.01)
*H02M 7/00* (2006.01)
(Continued)

(52) U.S. Cl.
CPC ........ *H02M 3/07* (2013.01); *H02M 2001/0058* (2013.01); *Y02B 70/1491* (2013.01)

(58) Field of Classification Search
CPC ........... H02M 3/07; H02M 2001/0058; Y02B 70/1491

USPC .............................. 363/59–60; 307/109–110; 327/536–538; 323/222–225, 259, 323/286–288

See application file for complete search history.

(56) References Cited

U.S. PATENT DOCUMENTS 4,375,594 A * 3/1983 Ewanizky, Jr. ................. 307/110
4,451,743 A * 5/1984 Suzuki et al. .................. 307/110
(Continued)

FOREIGN PATENT DOCUMENTS

JP 07-130484 A 5/1995
KR 10-1140336 B1 5/2012

OTHER PUBLICATIONS

Abutbul et al., "Step-Up Switching-Mode Converter With High Voltage Gain Using Switched-Capacitor Circuit," Aug. 2003, IEEE Transactions on Circuits and Systems—I: Fundamental Theory and Applications, vol. 50, No. 8, p. 1098-1102.*

(Continued)

*Primary Examiner* — Jue Zhang
(74) *Attorney, Agent, or Firm* — LRK Patent Law Firm

(57) ABSTRACT

A high efficiency DC/DC converter with high conversion ratio is provided. The DC/DC converter includes a power switch for selectively switching an electrical connection between one side of a power supply and anodes of a first diode and a second diode, a first capacitive element whose one side is connected to a cathode of the first diode, a second capacitive element whose one side is connected to a cathode of the second diode, a first-first switch for selectively switching an electrical connection between the other side of the first capacitive element and the other side of the power supply, and a second-first switch for selectively switching an electrical connection between the other side of the first capacitive element and one side of the second capacitive element.

13 Claims, 4 Drawing Sheets

(51) Int. Cl.
   *H02M 3/07* (2006.01)
   *H02M 1/00* (2006.01)

(56) References Cited

U.S. PATENT DOCUMENTS

| | | | | |
|---|---|---|---|---|
| 4,654,769 | A * | 3/1987 | Middlebrook | 363/16 |
| 5,095,223 | A * | 3/1992 | Thomas | 307/110 |
| 5,357,419 | A * | 10/1994 | Limpaecher | 363/140 |
| 5,486,752 | A | 1/1996 | Hua et al. | |
| 5,761,058 | A * | 6/1998 | Kanda et al. | 363/60 |
| 5,801,577 | A * | 9/1998 | Tailliet | 327/536 |
| 5,856,918 | A * | 1/1999 | Soneda et al. | 363/60 |
| 5,877,948 | A * | 3/1999 | Dijkmans | 363/60 |
| 5,909,107 | A * | 6/1999 | Aonuma et al. | 323/222 |
| 6,084,789 | A * | 7/2000 | Van Lieshout | 363/60 |
| 6,169,673 | B1 * | 1/2001 | McIntyre et al. | 363/59 |
| 6,198,645 | B1 * | 3/2001 | Kotowski et al. | 363/59 |
| 6,556,064 | B1 * | 4/2003 | Yatabe | 363/60 |
| 6,630,805 | B2 * | 10/2003 | Makaran | 318/400.26 |
| 8,212,541 | B2 * | 7/2012 | Perreault et al. | 323/282 |
| 2006/0028849 | A1 * | 2/2006 | Ogata et al. | 363/59 |
| 2006/0087295 | A1 * | 4/2006 | Jang et al. | 323/222 |
| 2008/0094866 | A1 * | 4/2008 | Bauman et al. | 363/50 |
| 2008/0239772 | A1 * | 10/2008 | Oraw et al. | 363/60 |
| 2010/0026264 | A1 * | 2/2010 | Ben-Yaakov et al. | 323/283 |
| 2010/0117612 | A1 * | 5/2010 | Klootwijk et al. | 323/282 |
| 2011/0090721 | A1 * | 4/2011 | Singer et al. | 363/62 |
| 2011/0169474 | A1 * | 7/2011 | Cuk | 323/311 |
| 2011/0175591 | A1 * | 7/2011 | Cuk | 323/311 |
| 2012/0044726 | A1 * | 2/2012 | Voyer | 363/60 |
| 2012/0091807 | A1 * | 4/2012 | Buiatti et al. | 363/60 |

OTHER PUBLICATIONS

Abutbul et al., "Boost Converter with High Voltage Gain Using a Switched Capacitor Circuit," May 2003, Proceedings of the 2003 International Symposium on Circuits and Systems (ISCAS '03), vol. 3, p. III-296 to III-299.*

Cao et al., "A Family of Zero Current Switching Switched-Capacitor DC-DC Converters," Feb. 2010, Twenty-Fifth Annual IEEE Applied Power Electronics Conference and Exposition 2010 (APEC), p. 1365-1372.*

Cao et al., "Zero-Current-Switching Multilevel Modular Switched-Capacitor DC-DC Converter," Sep. 2009, IEEE Energy Conversion Congress and Exposition (ECCE 2009), p. 3516-3522.*

Chen et al., "Switching-Mode DC-DC Converter with Switched-Capacitor-Based Resonant Circuit," Nov. 1996, IEEE Transaction on Circuits and Systems—I: Fundamental Theory and Applications, vol. 43, No. 11, p. 933-938.*

Cheng, "Zero-current-switching switched-capacitor converters," Sep. 2001, IEE Proceedings-Electric Power Applications, vol. 148, No. 5, p. 403-409.*

Chung, "Design and Analysis of a Switched-Capacitor-Based Step-Up DC/DC Converter With Continous Input Current," Jun. 1999, IEEE Transactions on Circuits and Systems—I: Fundamental Theory and Applications, vol. 46, No. 6., p. 722-730.*

Chung et al., "Development of a Multistage Current-Controlled Switched-Capacitor Step-Down DC/DC Converter with Continuous Input Current," Jul. 2000, IEEE Transactions on Circuits and Systems—I: Fundamental Theory and Applications, vol. 47, No. 7, p. 1017-1025.*

Keiser et al., "High Power Resonant Switched-Capacitor Step-Down Converter," Jun. 2008, IEEE Power Electronics Specialists Conference, 2008. (PESC 2008), p. 2772-2777.*

Makowski, "On Performance Limits of Switched-Capacitor Multi-Phase Charge Pump Circuits. Remarks on papers of Starzyk et al.," Sep. 14-17, 2008, International Conference on Signals and Electronic Systems, 2008 (ICSES '08), p. 309-312.*

Makowski, "On Systematic Modeling of Switched Capacitor DC-DC Converters: Incremental Graph Approach," Jun. 2010, 2010 IEEE 12th Workshop on Control and Modeling for Power Electronics (COMPEL), p. 1-6.*

Makowski, "Realizability Conditions and Bounds on Synthesis of Switched-Capacitor DC-DC Voltage Multiplier Circuits," Aug. 1997, IEEE Transactions on Circuits and Systems—I: Fundamental Theory and Applications, vol. 44, No. 8, p. 684-691.*

Mishima et al., "A New High Step-Up Soft Switching PWM Boost DC-DC Converter with Edge-Resonant Switched Capacitor Modular," May 30-Jun. 3, 2011, ECCE Asia—8th International Conference on Power Electronics, p. 846-853.*

Starzyk et al., "A DC-DC Charge Pump Design Based on Voltage Doublers," Mar. 2001, IEEE Transactions on Circuits and Systems—I: Fundamental Theory and Applications, vol. 48, No. 3, p. 350-359.*

Wong et al., "An Evaluation of 2-phase Charge Pump Topologies with Charge Transfer Switches for Green Mobile Technology," Jun. 2011, IEEE International Symposium on Industrial Electronics 2011, p. 136-140.*

Yeung et al., "Unified Analysis of Switched-Capacitor Resonant Converters," Aug. 2004, IEEE Transactions on Industrial Electronics, vol. 51, No. 4, p. 864-873.*

Yeung et al., "Zero-current switching switched-capacitor quasiresonant step-down converter," Aug. 2002, IEE Proceedings—Electric Power Applications., vol. 149, No. 2 p. 111-121.*

Zhu et al., "Steady-State Performance Analysis of Cascade Boost Converters," Dec. 2006, IEEE Asia Pacific Conference on Circuits and Systems, p. 658-661.*

R. Xie et al., "A New Large DC Gain Converter Based on a Switched-Capacitor-Inductor Circuit in Conjunction with Fuel Cell," IEEE 7th International Power Electronics and Motion Control Conference—ECCE Asia, Jun. 2-5, 2012, pp. 379-383.*

D. Cao et al., "A Family of Zero Current Switching Switched-Capacitor DC-DC converters," Applied Power Electronics Conference (APEC), Feb. 21-25, 2010, pp. 1365-1372.*

KIPO Notice of Allowance for Korean Patent Application No. 10-2012-0091754 which corresponds to the above-identified U.S. Application, Sep. 24, 2013.

On-Cheong Mak et al., "Step-up DC Power Supply Based on a Switched-Capacitor Circuit", IEEE Transactions on Industrial Electronics, vol. 42, No. 1, Feb. 1995.

* cited by examiner

- $C_1 = C_2 = C_3 = C$
- Switching operation sequence
  ① S1, SA, SB ON / SAA, SBB, OFF
  ② S1, SA, SB OFF / SAA, SBB, ON

< $S_1$, $S_A$, $S_B$ OFF / $S_{AA}$, $S_{BB}$, ON >

$V_{C_1} = V_{C_2} = V_{C_3} = V_S$
$V_{out} = 3V_S$

HIGH EFFICIENCY DC/DC CONVERTER WITH HIGH CONVERSION RATIO

CROSS-REFERENCE TO RELATED PATENT APPLICATION

This application claims the benefit of Korean Patent Application No. 10-2012-0091754, filed on Aug. 22, 2012, in the Korean Intellectual Property Office, the disclosure of which is incorporated herein in its entirety by reference.

BACKGROUND OF THE INVENTION

1. Field of the Invention

The present invention relates to a high-efficiency DC/DC converter with high conversion ratio and, more particularly, to a DC/DC converter which can boost DC voltage as desired with a simple structure and a simple switching control using a minimum number of active elements and passive elements.

2. Description of the Related Art

A DC/DC converter refers to an electronic circuit device that converts a voltage of direct current (DC) power into another voltage of the DC power, and, in a broad sense, may comprise a device in which a DC motor and a DC generator are mechanically coupled together. The DC/DC converter is used in almost all electronic devices that require the conversion of the DC power.

However, a conventional DC/DC converter comprises a large number of active elements and passive elements and has a complicated circuit structure as well as a complicated switching operation for the conversion of the voltage.

Moreover, the conventional DC/DC converter may have many losses due to the complicated switching operation during the conversion of the voltage.

Furthermore, the conversion ratio of the conventional converters is limited to a predetermined range and, for example, in the case of a boost converter, the conversion ratio of the DC power must be limited to a range of less than 2.5 due to parasitic resistance.

Thus, the development of a new concept of DC/DC converter which can solve the problems of the conventional DC/DC converters is required.

PRIOR ART LITERATURE

Patent Literature: Korean Patent No. 10-1140336

SUMMARY OF THE INVENTION

The present invention has been made in an effort to meet the above-described technical requirements, to solve the above-described problems associated with prior art, and to provide a technique that cannot be readily developed by those having ordinary skill in the art.

Therefore, an object of the present invention is to provide a DC/DC converter with a new structure, which can control the conversion with a very simple switching operation using a minimum number of active elements and passive elements and can increase the rate, at which the voltage is boosted, as necessary.

In one aspect, an exemplary embodiment of the present invention provides a DC/DC converter comprising: a power switch for selectively switching an electrical connection between one side of a power supply and anodes of a first diode and a second diode; a first capacitive element whose one side is connected to a cathode of the first diode; a second capacitive element whose one side is connected to a cathode of the second diode; a first-first switch for selectively switching an electrical connection between the other side of the first capacitive element and the other side of the power supply; and a second-first switch for selectively switching an electrical connection between the other side of the first capacitive element and one side of the second capacitive element.

The DC/DC converter in accordance with an exemplary embodiment of the present invention may further comprise an output diode whose anode is connected to one side of the first capacitive element and whose cathode is connected to one side of an output element.

The cathode of the output diode may be connected to one side of an output capacitive element and one side of an output load.

The DC/DC converter in accordance with an exemplary embodiment of the present invention may further comprise: a first inductive element connected between one side of the power switch and the anodes of the first diode and the second diode; and a second inductive element connected between one side of the first capacitive element and the anode of the output diode.

The power switch, the first-first switch, and the second-first switch may be operated under zero-current switching.

The DC/DC converter in accordance with an exemplary embodiment of the present invention may comprise a switching operation including: a first phase in which the power switch and the first-first switch are turned on and the second-first switch is turned off; and a second phase in which the power switch and the first-first switch are turned off and the second-first switch is turned on.

The DC/DC converter in accordance with an exemplary embodiment of the present invention may comprise: a third diode whose anode is connected to a contact point between the anode of the first diode and the anode of the second diode; a third capacitive element whose one side is connected to a cathode of the third diode; a first-second switch for selectively switching an electrical connection between the other side of the second capacitive element and the other side of the power supply; and a second-second switch for selectively switching an electrical connection between the other side of the second capacitive element and one side of the third capacitive element.

The DC/DC converter in accordance with an exemplary embodiment of the present invention may comprise a switching operation including: a first phase in which the power switch, the first-first switch, and the first-second switch are turned on and the second-first switch and the second-second switch are turned off; and a second phase in which the power switch, the first-first switch, and the first-second switch are turned off and the second-first switch and the second-second switch are turned on.

The DC/DC converter in accordance with an exemplary embodiment of the present invention may further comprise: an nth diode whose anode is connected to a contact point between the anode of the first diode to an anode of an (n−1)th diode; an nth capacitive element whose one side is connected to a cathode of the nth diode; a first-(n−1)th switch for selectively switching an electrical connection between the other side of an (n−1)th capacitive element and the other side of the power supply; and a second-(n−1)th switch for selectively switching an electrical connection between the other side of the (n−1)th capacitive element and one side of the nth capacitive element, thus boosting the voltage N times.

The DC/DC converter in accordance with an exemplary embodiment of the present invention may comprise a switching operation including: a first phase in which the power switch and the first-first switch to the first-(n−1)th switch are turned on and the second-first switch to the second-(n−1)th switch are turned off; and a second phase in which the power switch and the first-first switch to the first-(n−1)th switch are turned off and the second-first switch to the second-(n−1)th switch are turned on.

The voltage may be boosted at a rate proportional to the number of the capacitive elements included therein.

A plurality of stages may be formed by connecting a plurality of DC/DC converters in series, and the conversion ratio is increased by the connection of the plurality of DC/DC converters.

When the number of the stages is K and the number of capacitive elements included in each stage is L, the conversion ratio may be the kth power of L.

BRIEF DESCRIPTION OF THE DRAWINGS

The above and other features and advantages of the present invention will become more apparent by describing in detail exemplary embodiments thereof with reference to the attached drawings in which.

DESCRIPTION OF REFERENCE NUMERALS

Figure 1:
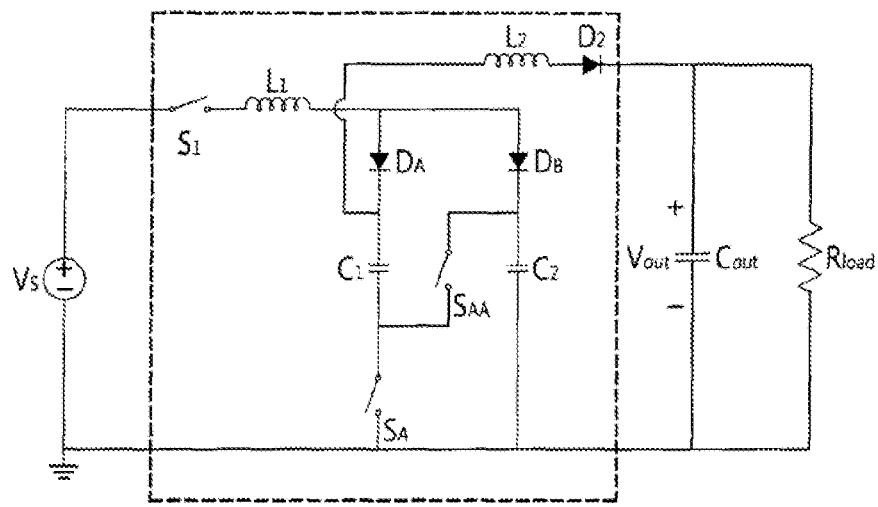
FIG. 1 is a diagram showing an exemplary embodiment of a DC/DC converter according to the present invention.

| | |
|---|---|
| $V_s$: power supply | $S_1$: power switch |
| $L_1$: first inductive element | $L_2$: second inductive element |
| $D_A$: first diode | $D_B$: second diode |
| $D_C$: third diode | $D_N$: nth diode |
| $D_2$: output diode | $C_1$: first capacitive element |
| $C_2$: second capacitive element | $C_3$: third capacitive element |
| $C_N$: nth capacitive element | $C_{out}$: output capacitive element |
| $R_{load}$: output load | $S_A$: first-first switch |
| $S_B$: first-second switch | $S_C$: first-third switch |
| $S_{AA}$: second-first switch | $S_{BB}$: second-second switch |

DETAILED DESCRIPTION OF THE INVENTION

Hereinafter, a DC/DC converter according to the present invention will be described in detail with reference to the accompanying drawings. The following exemplary embodiments are provided only for illustrative purposes so that those skilled in the art can fully understand the spirit of the present invention. Therefore, the present invention is not limited to the following exemplary embodiments but may be implemented in other forms. In the drawings, the widths, lengths, thicknesses and the like of elements are exaggerated for convenience of illustration. Like reference numerals indicate like elements throughout the specification and drawings.

As used herein, the term "comprising" is inclusive or open-ended and does not exclude the presence of additional components. Moreover, it will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Next, an exemplary embodiment of a DC/DC converter according to the present invention will be described with reference to FIG. 1.

Referring to FIG. 1, an exemplary embodiment of a DC/DC converter according to the present invention may comprise a power switch $S_1$ for selectively switching an electrical connection between one side of a power supply $V_s$ and anodes of a first diode $D_A$ and a second diode $D_B$, a first capacitive element $C_1$ whose one side is connected to a cathode of the first diode $D_A$, a second capacitive element $C_2$ whose one side is connected to a cathode of the second diode $D_B$, a first-first switch $S_A$ for selectively switching an electrical connection between the other side of the first capacitive element $C_1$ and the other side of the power supply $V_s$, and a second-first switch $S_{AA}$ for selectively switching an electrical connection between the other side of the first capacitive element $C_1$ and one side of the second capacitive element $C_2$.

Moreover, the DC/DC converter may further comprise an output diode $D_2$. Here, an anode of the output diode $D_2$ may be connected to one side of the first capacitive element $C_1$ and the cathode of the first diode $D_A$, and a cathode of the output diode $D_2$ may be connected to one side of an output capacitive element $C_{out}$ and one side of an output load $R_{load}$.

The DC/DC converter may further comprise a first inductive element $L_1$ and a second inductive element $L_2$ for inducing resonance in current preferably in conjunction with the capacitive elements. Here, the first inductive element $L_1$ may preferably be connected between one side of the power switch $S_1$ and the anodes of the first diode $D_A$ and the second diode $D_B$. Moreover, the second inductive element $L_2$ may preferably be connected between one side of the first capacitive element $C_1$ and the anode of the output diode $D_2$.

The power supply $V_s$ may be configured with various types of power supplies and may preferably be configured with a DC power supply for generating a DC voltage.

The first capacitive element $C_1$ and the second capacitive element $C_2$ may be implemented with various electronic elements having capacitance values and may preferably be implemented with a capacitor.

Moreover, the first inductive element $L_1$ and the second inductive element $L_2$ may be implemented with various electronic elements having inductance values and may preferably be implemented with an inductor.

The power switch $S_1$, the first-first switch $S_A$, and the second-first switch $S_{AA}$ may be implemented with various types of switching elements such as a thyristor, a gate turn-off switch (GTO), a field effect transistor (FET), an integrated gate commutated thyristor (IGCT), an insulated gate bipolar transistor (IGBT), etc. Moreover, the above-described switches may be operated under zero-current switching by the resonance of the capacitive elements $C_1$, $C_2$, and $C_{out}$ and the inductive elements $L_1$ and $L_2$, and thus the zero-current switching can reduce switching loss.

The DC/DC converter can boost the voltage of the power supply to various values by configuring the operation of the power switch $S_1$, the first-first switch $S_A$, and the second-first switch $S_{AA}$ in various combinations. In detail, it is possible to implement various conversion ratios of the DC/DC converter by controlling the ON/OFF sequence of the power switch $S_1$, the first-first switch $S_A$, and the second-first switch $S_{AA}$ in various ways.

Meanwhile, the operation of the switches may be set up in the following combination, and the DC/DC converter can easily implement a conversion ratio of 2 times by a simple switching operation of two phases:

First phase: $S_1$ & $S_A$→ON/$S_{AA}$→OFF; and
Second phase: $S_1$ & $S_A$→OFF/$S_{AA}$→ON.

In detail, the same voltage as the power supply $V_s$ is charged in the first capacitive element $C_1$ (capacitive element $C_1$ is charged by the power supply $V_s$) and the second capacitive element $C_2$, respectively, by the switching operation of the first phase, and the capacitive element $C_1$ and the second capacitive element $C_2$ are connected in series by the switching operation of the second phase, thus implementing an output voltage $2V_s$ boosted two times the input voltage.

Next, another exemplary embodiment of a DC/DC converter according to the present invention will be described with reference to FIG. 2.

Figure 2:
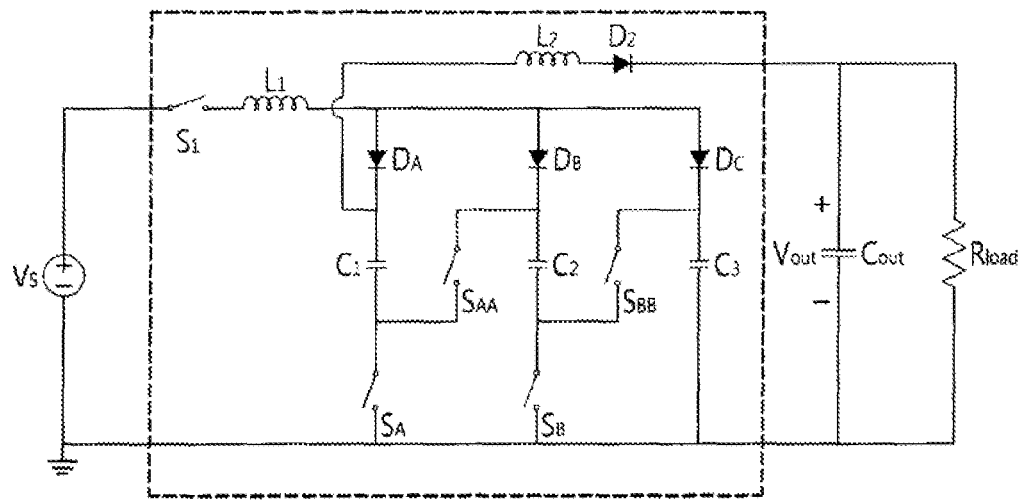
FIG. 2 is a diagram showing another exemplary embodiment of a DC/DC converter according to the present invention.

Referring to FIG. 2, another exemplary embodiment of a DC/DC converter according to the present invention may comprise a power switch $S_1$ for selectively switching an electrical connection between one side of a power supply Vs and anodes of a first diode $D_A$, a second diode $D_B$, and a third diode $D_C$, a first capacitive element $C_1$ whose one side is connected to a cathode of the first diode $D_A$, a second capacitive element $C_2$ whose one side is connected to a cathode of the second diode $D_B$, a third capacitive element $C_3$ whose one side is connected to a cathode of the third diode $D_C$, a first-first switch $S_A$ for selectively switching an electrical connection between the other side of the first capacitive element $C_1$ and the other side of the power supply $V_s$, a first-second switch $S_B$ for selectively switching an electrical connection between the other side of the second capacitive element $C_2$ and the other side of the power supply $V_s$, a second-first switch $S_{AA}$ for selectively switching an electrical connection between the other side of the first capacitive element $C_1$ and one side of the second capacitive element $C_2$, and a second-second switch $S_{BB}$ for selectively switching an electrical connection between the other side of the second capacitive element C2 and one side of the third capacitive element $C_3$.

Moreover, the DC/DC converter may further comprise an output diode $D_2$. Here, an anode of the output diode $D_2$ may be connected to one side of the first capacitive element $C_1$ and the cathode of the first diode $D_A$, and a cathode of the output diode $D_2$ may be connected to one side of an output capacitive element $C_{out}$ and one side of an output load $R_{load}$.

The DC/DC converter may further comprise a first inductive element $L_1$ and a second inductive element $L_2$ for inducing resonance in current preferably in conjunction with the capacitive elements. Here, the first inductive element $L_1$ may preferably be connected between one side of the power switch $S_1$ and the anodes of the first diode $D_A$, the second diode $D_B$, and the third diode $D_C$. Moreover, the second inductive element $L_2$ may preferably be connected between one side of the first capacitive element $C_1$ and the anode of the output diode $D_2$.

As a result, the DC/DC converter has a structure in which the third diode $D_C$, the third capacitive element $C_3$, the first-second switch $S_B$, and the second-second switch $S_{BB}$ are further provided, compared to the DC/DC converter of FIG. 1.

The power supply $V_s$ may also be configured with various types of power supplies and may preferably be configured with a DC power supply for generating a DC voltage.

Moreover, the first capacitive element $C_1$, the second capacitive element $C_2$, and the third capacitive element $C_3$ may also be implemented with various electronic elements having capacitance values and may preferably be implemented with a capacitor.

Furthermore, the first inductive element $L_1$ and the second inductive element $L_2$ may also be implemented with various electronic elements having inductance values and may preferably be implemented with an inductor.

The power switch $S_1$, the first-first switch $S_A$, the first-second switch $S_B$, the second-first switch $S_{AA}$, and the second-second switch $S_{BB}$ may also be implemented with various types of switching elements such as a thyristor, a gate turn-off switch (GTO), a field effect transistor (FET), an integrated gate commutated thyristor (IGCT), an insulated gate bipolar transistor (IGBT), etc. Moreover, the above-described switches may be operated under zero-current switching by the resonance of the capacitive elements $C_1$, $C_2$, $C_3$, and $C_{out}$ and the inductive elements $L_1$ and $L_2$, and thus the zero-current switching can reduce switching loss.

The DC/DC converter can boost the voltage of the power supply to various values by configuring the operation of the power switch $S_1$, the first-first switch $S_A$, the first-second switch $S_B$, the second-first switch $S_{AA}$, and the second-second switch $S_{BB}$ in various combinations. In detail, it is possible to implement various conversion ratios of the DC/DC converter by controlling the ON/OFF sequence of the power switch $S_1$, the first-first switch $S_A$, the first-second switch $S_B$, the second-first switch $S_{AA}$, and the second-second switch $S_{BB}$ in various ways.

Meanwhile, the operation of the switches may be set up in the following combination in the following combination, and the DC/DC converter can easily implement a conversion ratio of 3 times by a simple switching operation of two phases:

First phase: $S_1$, $S_A$ & $S_B$→ON/$S_{AA}$ & $S_{BB}$→OFF; and
Second phase: $S_1$, $S_A$ & $S_B$→OFF/$S_{AA}$ & $S_{BB}$→ON.

In detail, the same voltage as the power supply $V_s$ is charged in the first capacitive element $C_1$, the second capacitive element $C_2$, and the third capacitive element $C_3$, respectively, by the switching operation of the first phase, and the capacitive element $C_1$, the second capacitive element $C_2$, and the third capacitive element $C_3$ are connected in series by the switching operation of the second phase, thus implementing an output voltage $3V_s$ boosted three times the input voltage.

As a result, the DC/DC converter of FIG. 2 has an expanded structure in which the third diode $D_C$, the third capacitive element $C_3$, the first-second switch $S_B$, and the second-second switch $S_{BB}$ are further provided, compared to the DC/DC converter of FIG. 1, and operates in a similar switching manner.

Moreover, through the above-described configuration, the DC/DC converter in accordance with another exemplary embodiment of the present invention has an increased conversion ratio (e.g., 2 times→3 times), compared to the DC/DC converter of FIG. 1.

Next, still another exemplary embodiment of a DC/DC converter according to the present invention will be described with reference to FIG. 3.

As above, the process of increasing the conversion ratio (e.g., 2 times→3 times) by adding the simple elements (e.g., the third diode, the third capacitive element, the first-second switch, and the second-second switch) to the DC/DC converter of FIG. 1 has been described, and this process of increasing the conversion ratio can be continuously expanded to normal forms.

For example, it is possible to increase the conversion ratio of 3 times to a conversion ratio of 4 times by adding a fourth diode whose anode is connected to a contact point between the anode of the first diode $D_A$, the anode of the second diode $D_B$, and the anode of the third diode $D_C$, a fourth capacitive element whose one side is connected to a cathode of the fourth diode, a first-third switch $S_C$ for selectively switching an electrical connection between the other side of the third capacitive element $C_3$ and the other side of the power supply, and a second-third switch for selectively switching an electrical connection between the other side of the third capacitive element $C_3$ and one side of the fourth capacitive element to the DC/DC converter of FIG. 2 and then controlling the switching operation as follows:

First phase: $S_1$, $S_A$, $S_B$ & $S_C$→ON/

$S_{AA}$, $S_{BB}$ & second-third switch→OFF; and

Second phase: $S_1$, $S_A$, $S_B$ & $S_C$→OFF/

$S_{AA}$, $S_{BB}$ & second-third switch→ON.

Moreover, it is possible to increase the conversion ratio of 4 times to a conversion ratio of 5 times by adding a fifth diode, a fifth capacitive element, a first-fourth switch, and a second-fourth switch to the above DC/DC converter and then controlling the switching operation in a similar manner.

Figure 3:
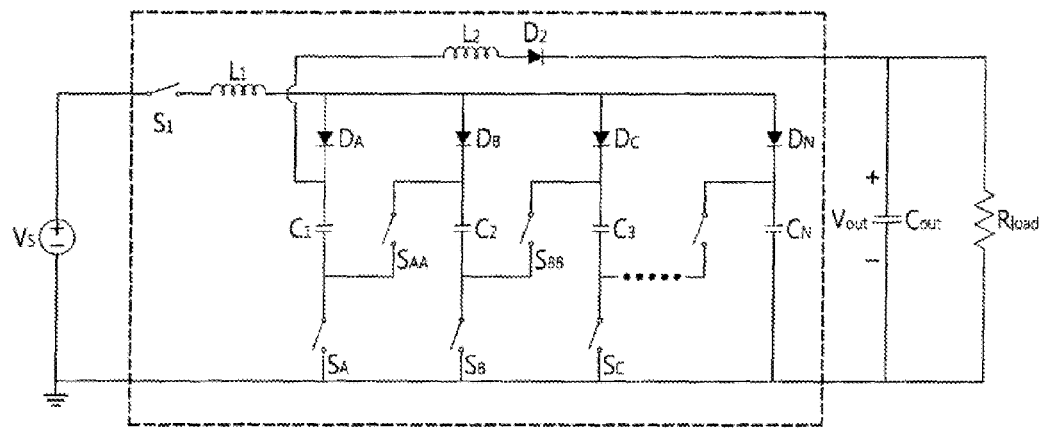
FIG. 3 is a diagram showing still another exemplary embodiment of a DC/DC converter according to the present invention.

As a result, it is possible to provide a DC/DC converter having an increased conversion ratio as shown in FIG. 3 in accordance with still another exemplary embodiment of the present invention, and thus it is possible to increase the conversion ratio of the DC/DC converter to a conversion ratio of N times based on the above rule.

In detail, it is possible to implement the conversion ratio of N times by adding elements to the DC/DC converter of FIG. 1 based on the following rule.

Sequentially substitute values from 3 to N for n & add elements (first to fourth elements) to each n value

TABLE 1

First element: an nth diode whose anode is connected to a contact point between an anode of a first diode to an anode of an (n − 1)th diode;
Second element: an nth capacitive element whose one side is connected to a cathode of the nth diode;
Third element: a first-(n − 1)th switch for selectively switching an electrical connection between the other side of an (n − 1)th capacitive element and the other side of the power supply; and
Fourth element: a second-(n − 1)th switch for selectively switching an electrical connection between the other side of the (n − 1)th capacitive element and one side of the nth capacitive element.

For example, to configure a DC/DC converter with a conversion ratio of 5 times from the DC/DC converter of FIG. 1:

Substitute 3 for n & add first to fourth elements;

Substitute 4 for n & add first to fourth elements; and

Substitute 5 for n & add first to fourth elements.

Meanwhile, in this case, the switching operation for implementing the conversion ratio of N times may preferably be controlled as follows:

First phase: $S_1$ and first-first switch to first-(N−1)th switch→ON/

Second-first switch to second-(N−1)th switch→OFF; and

Second phase: $S_1$ and first-first switch to first-(N−1)th switch→OFF/

Second-first switch to second-(N−1)th switch→ON.

Moreover, the switching frequency $\omega_s$ may preferably have the same value as the resonant frequency.

Resonant Frequency 1 (Charge Mode of $C_1$ to $C_N$)

$$\omega_1 = \frac{1}{2\pi\sqrt{(C_1 + C_2 + C_3 + \ldots + C_N) \times L_1}}$$

Resonant Frequency 2 (Charge Mode of $C_{out}$)

$$\omega_2 = \frac{1}{2\pi\sqrt{\left(\frac{C_{eq} \times C_{out}}{C_{eq} + C_{out}}\right) \times L_2}}, \frac{1}{C_{eq}} = \frac{1}{C_1} + \frac{1}{C_2} + \frac{1}{C_3} \ldots + \frac{1}{C_N}$$

In detail, the switching frequency $\omega_s$ may preferably have the same value ($\omega_s = \omega_1 = \omega_2$) as the above two resonant frequencies ($\omega_1$ and $\omega_2$), and thus the values of the capacitive elements $C_1, C_2, C_3, \ldots C_N$ and the inductive elements $L_1$ and $L_2$ may be selected from various combinations in which the two frequency values ($\omega_1$ and $\omega_2$) are equal to each other.

As a result, it is possible to boost the input voltage N times by adding the elements to the DC/DC converter based on the above-described rule and then controlling the switching operation in the above manner (for reference, when the input voltage is boosted N times, the DC/DC converter includes an N number of capacitive elements, and thus the DC/DC converter boosts the voltage at the same rate as the number of the capacitive elements included in the DC/DC converter).

Next, examples of specific operations of the DC/DC converter according to the present invention will be described with reference to FIGS. 4 to 6.

Figure 4:
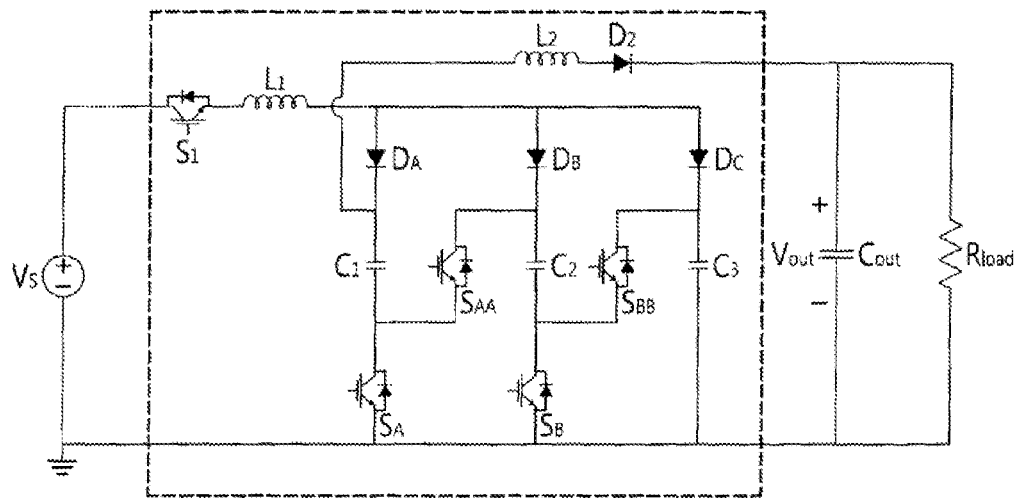
FIGS. 4 to 6 are diagrams showing examples of specific operations of the DC/DC converter according to the present invention.

A DC/DC converter of FIG. 4 is a specific embodiment in which the conversion ratio of 3 times as shown in FIG. 2 can be implemented and may have the same configuration as the circuit shown in FIG. 2.

Here, the switches included in the circuit may be implemented with an insulated gate bipolar transistor (IGBT) among the above-described various embodiments.

Moreover, it is assumed that the first capacitive element $C_1$, the second capacitive element $C_2$, and the third capacitive element $C_3$ included in the DC/DC converter of FIG. 4 are all the same ($C_1 = C_2 = C_3 = C_4$), and the conversion operation of the DC/DC converter under these conditions will be described in detail below.

The DC/DC converter of FIG. 4 may boost the input voltage based on the switching operation of two phases:

First phase: $S_1$, $S_A$ & $S_B$→ON/$S_{AA}$ & $S_{BB}$→OFF; and

Second phase: $S_1$, $S_A$ & $S_B$→OFF/$S_{AA}$ & $S_{BB}$→ON.

Figure 5:
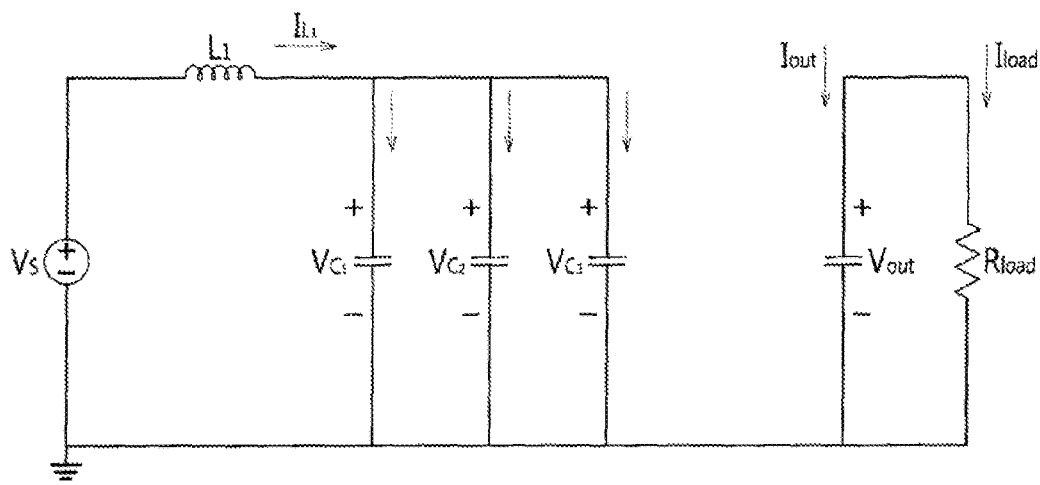
Figure 6:
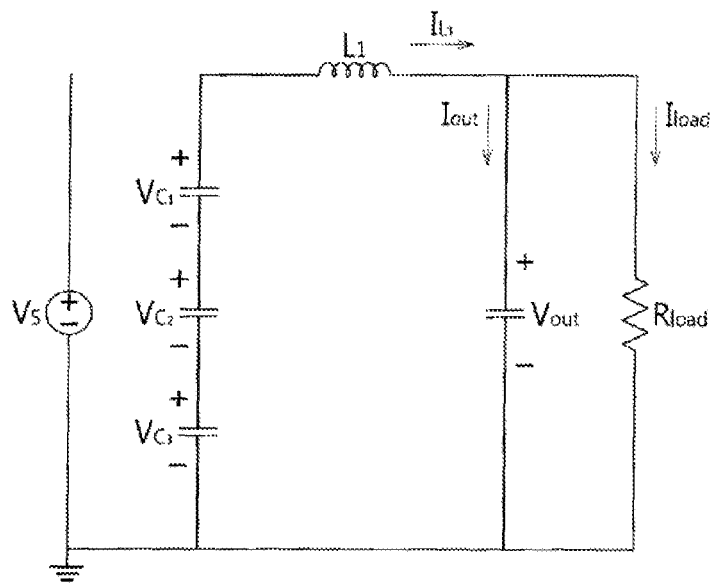

FIG. 5 is a diagram showing the switching operation of the first phase, and FIG. 6 is a diagram showing the switching operation of the second phase.

The capacitive elements $C_1$, $C_2$, and $C_3$ are connected to the power supply in parallel by the switching operation of the first phase (FIG. 5) and thus charged with the same voltage $V_s$ as the power supply.

Then, the connection between the capacitive elements $C_1$, $C_2$, and $C_3$ and the power supply is cut off by the switching operation of the second phase (FIG. 6), and the capacitive elements $C_1$, $C_2$, and $C_3$ are connected to each other in series ($V_s + V_s + V_s$) and connected to the output capacitive element $C_{out}$ and the output load $R_{load}$ in parallel. Thus, a voltage $3V_s$ boosted three times the input voltage $V_s$ is applied to the capacitive element $C_{out}$ and the output load $R_{load}$.

Meanwhile, in the first phase and the second phase, the switching operation of the power switch $S_1$, the first-first switch $S_A$, the first-second switch $S_B$, the second-first switch $S_{AA}$, and the second-second switch $S_{BB}$ may preferably be operated under zero-current switching.

In detail, the zero-current switching may be implemented by a resonant switching method by configuring the switching frequency ($\omega_s$, in units of Hz) as follows:

Resonant Frequency 1 (Charge Mode of $C_1$, $C_2$ & $C_3$, FIG. 5)

$$\omega_1 = \frac{1}{2\pi\sqrt{3C \times L_1}}$$

C must take subscript 1 in equation above.

Resonant Frequency 2 (Charge Mode of $C_{out}$, FIG. 6)

$$\omega_2 = \frac{1}{2\pi\sqrt{\left(\frac{C}{3} // C_{out}\right) \times L_2}}$$

$$\omega_2 = \frac{1}{2\pi\sqrt{\left(\frac{\frac{C_1}{3} \times C_{out}}{\frac{C_1}{3} + C_{out}}\right) \times L_2}}$$

The switching frequency $\omega_s$ may preferably have the same value ($\omega_s=\omega_1=\omega_2$) as the above two resonant frequencies ($\omega_1$ and $\omega_2$), and thus the values of the capacitive elements $C_1$, $C_2$, and $C_3$ and the inductive elements $L_1$ and $L_2$ may be selected from various combinations in which the two frequency values ($\omega_1$ and $\omega_2$) are equal to each other.

Accordingly, the values of the inductive elements $L_1$ and $L_2$ may be selected from combinations that satisfy $\omega_1=\omega_2$ in the embodiments of FIGS. 4 to 6.

Next, an exemplary embodiment in which the DC/DC converter according to the present invention forms a plurality of stages will be described with reference to FIG. 7.

Figure 7:
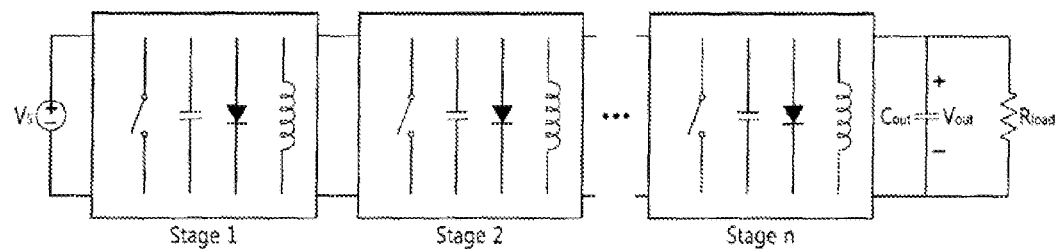
FIG. 7 is a diagram showing an exemplary embodiment in which the DC/DC converter according to the present invention forms a plurality of stages.

Referring to FIG. 7, the DC/DC converter according to the present invention may form a plurality of stages by connecting a plurality of DC/DC converters in series, and the conversion ratio can be increased by the stage structure.

Here, the DC/DC converter according to the present invention may be implemented in each stage and, for example, the conversion circuits as shown in FIGS. 1 to 3 may be included in each stage.

Accordingly, the DC/DC converter according to the present invention can increase the degree of freedom in controlling the conversion ratio by configuring the plurality of stages. In detail, it is possible to control the conversion ratio by controlling the number of stages at the entire level and control the conversion ratio by controlling the structure of the stage itself (i.e., the structure of the DC/DC converter) at each stage level, thus increasing the degree of freedom in controlling the conversion ratio.

Meanwhile, the DC/DC converter according to the present invention can boost the voltage at the same rate as the number of the capacitive elements included therein. Thus, when the number of stages is K and the number of capacitive elements included in each stage is L in the structure of FIG. 7, the conversion ratio may be implemented as the $k^{th}$ power of L.

Moreover, as a simple example, assuming that the DC/DC converter of the present invention comprises three stages (1 to 3), the number of capacitive elements in stage 1 is 3, the number of capacitive elements in stage 2 is 2, and the number of capacitive elements in stage 3 is 4, the voltage is boosted 24 times (3×2×4).

As described above, the DC/DC converter according to the present invention may have a very simple structure including a minimum number of active elements and passive elements. Thus, it is possible to significantly simplify the entire circuit structure and significantly improve the productivity and economics of the DC/DC converter.

Moreover, the DC/DC converter according to the present invention can boost the DC power by a simple switching operation.

Furthermore, since the DC/DC converter according to the present invention can boost the voltage by a simple switching operation and the switches are operated under zero-current switching, it is possible to reduce switching loss that may occur during the conversion process of the DC/DC converter.

In addition, the DC/DC converter according to the present invention can increase the conversion ratio of the DC power as desired. That is, it is possible to increase the conversion ratio of the voltage by adding very simple elements based on certain rules.

Additionally, the DC/DC converter according to the present invention can boost the voltage at the same rate as the number of the capacitive elements included therein. Thus, it is possible to directly control the conversion ratio by controlling the number of the capacitive elements included in the DC/DC converter.

Moreover, the DC/DC converter according to the present invention can increase the degree of freedom in controlling the conversion ratio by configuring a plurality of stages with a plurality of DC/DC converters. That is, it is possible to control the conversion ratio by controlling the number of stages at the entire level and control the conversion ratio by controlling the structure of the stage itself at each stage level, thus implementing a DC/DC converter capable of controlling the conversion ratio.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A DC/DC converter comprising:
   a power switch for selectively switching an electrical connection between one side of a power supply and anodes of a first diode and a second diode;
   a first capacitive element whose one side is connected to a cathode of the first diode;
   a second capacitive element whose one side is connected to a cathode of the second diode;
   a first-first switch for selectively switching an electrical connection between the other side of the first capacitive element and the other side of the power supply; and
   a second-first switch for selectively switching an electrical connection between the other side of the first capacitive element and one side of the second capacitive element,
   wherein the first-first switch is turned on while the second first switch is turned off, and the first-first switch is turned off while the second-first switch is turned on.

2. The DC/DC converter of claim 1, further comprising an output diode whose anode is connected to one side of the first capacitive element and whose cathode is connected to one side of an output element.

3. The DC/DC converter of claim 2, wherein the cathode of the output diode is connected to one side of an output capacitive element and one side of an output load.

4. The DC/DC converter of claim 2, further comprising:
a first inductive element connected between one side of the power switch and the anodes of the first diode and the second diode; and
a second inductive element connected between one side of the first capacitive element and the anode of the output diode.

5. The DC/DC converter of claim 4, wherein the power switch, the first-first switch, and the second-first switch are operated under zero-current switching.

6. The DC/DC converter of claim 2, comprising a switching operation including:
a first phase in which the power switch and the first-first switch are turned on and the second-first switch is turned off; and
a second phase in which the power switch and the first-first switch are turned off and the second-first switch is turned on.

7. The DC/DC converter of claim 2, further comprising:
a third diode whose anode is connected to a contact point between the anode of the first diode and the anode of the second diode;
a third capacitive element whose one side is connected to a cathode of the third diode;
a first-second switch for selectively switching an electrical connection between the other side of the second capacitive element and the other side of the power supply; and
a second-second switch for selectively switching an electrical connection between the other side of the second capacitive element and one side of the third capacitive element.

8. The DC/DC converter of claim 7, comprising a switching operation including:
a first phase in which the power switch, the first-first switch, and the first-second switch are turned on and the second-first switch and the second-second switch are turned off; and
a second phase in which the power switch, the first-first switch, and the first-second switch are turned off and the second-first switch and the second-second switch are turned on.

9. The DC/DC converter of claim 7, further comprising:
an nth diode whose anode is connected to a contact point between the anode of the first diode to an anode of an (n−1)th diode;
an nth capacitive element whose one side is connected to a cathode of the nth diode;
a first-(n−1)th switch for selectively switching an electrical connection between the other side of an (n−1)th capacitive element and the other side of the power supply; and
a second-(n−1)th switch for selectively switching an electrical connection between the other side of the (n−1)th capacitive element and one side of the nth capacitive element, thus boosting the voltage N times.

10. The DC/DC converter of claim 9, comprising a switching operation including:
a first phase in which the power switch and the first-first switch to the first-(n−1)th switch are turned on and the second-first switch to the second-(n−1)th switch are turned off; and
a second phase in which the power switch and the first-first switch to the first-(n−1)th switch are turned off and the second-first switch to the second-(n−1)th switch are turned on.

11. The DC/DC converter of claim 2, wherein the voltage is boosted at a rate proportional to the number of the capacitive elements included therein.

12. The DC/DC converter of claim 11, wherein a plurality of stages are formed by connecting a plurality of DC/DC converters in series, and the conversion ratio is increased by the connection of the plurality of DC/DC converters.

13. The DC/DC converter of claim 12, wherein when the number of the stages is K and the number of capacitive elements included in each stage is L, the conversion ratio is the kth power of L.

* * * * *